(12) United States Patent
Salgado

(10) Patent No.: US 7,359,083 B2
(45) Date of Patent: Apr. 15, 2008

(54) EXCLUDING UNWANTED PAGES IN A PRINTING SYSTEM JOB

(75) Inventor: David A. Salgado, Victor, NY (US)

(73) Assignee: Xerox Corporation, Norfolk, CT (US)

(*) Notice: Subject to any disclaimer, the term of this patent is extended or adjusted under 35 U.S.C. 154(b) by 1459 days.

(21) Appl. No.: 09/731,157

(22) Filed: Dec. 6, 2000

(65) Prior Publication Data

US 2002/0122189 A1 Sep. 5, 2002

(51) Int. Cl.
G06F 15/00 (2006.01)
(52) U.S. Cl. ............... 358/1.18; 358/1.11; 358/1.12; 358/1.14; 358/538
(58) Field of Classification Search ............... 358/1.18, 358/1.11, 1.12, 1.14, 538
See application file for complete search history.

(56) References Cited

U.S. PATENT DOCUMENTS

| 5,414,448 A | * | 5/1995 | Wada et al. ................. 345/658 |
| 5,550,614 A | * | 8/1996 | Motoyama .................... 399/18 |
| 5,872,569 A | | 2/1999 | Salgado et al. |
| 5,898,592 A | | 4/1999 | Salgado et al. |
| 5,946,527 A | | 8/1999 | Salgado et al. |
| 6,130,760 A | | 10/2000 | Nickerson |
| 6,233,057 B1 | * | 5/2001 | Ota ............................. 358/1.13 |
| 6,501,556 B1 | * | 12/2002 | Nishii ......................... 358/1.12 |

FOREIGN PATENT DOCUMENTS

| JP | 07307827 | * 11/1995 |
| JP | 08335009 | * 12/1996 |
| JP | 10202983 | * 8/1998 |

* cited by examiner

Primary Examiner—Kimberly Williams
Assistant Examiner—Michael Burleson
(74) Attorney, Agent, or Firm—Fay Sharpe LLP

(57) ABSTRACT

A method operative to automatically exclude unwanted or wasteful portions of a printing system job includes steps for, describing an unwanted portion of the job, and locating instances of the described portion within the job. For example, blank pages are located within a copy job and removed from an output stream, thereby conserving material, time, and reducing equipment wear. A printing system, such as, for example, an electronic document processor, fax machine or copier, operative to perform the method, includes a pattern detector and a portion deleter. The pattern detector searches input data for portions matching an unwanted portion description. When appropriate, the portion deleter removes unwanted portions from the input data.

14 Claims, 2 Drawing Sheets

EXCLUDING UNWANTED PAGES IN A PRINTING SYSTEM JOB

BACKGROUND OF THE INVENTION

1. Field of the Invention

The present invention relates generally to the art of job processing in a printing system. The present invention finds application where the input in a printing, copying or faxing job includes images or pages that are unwanted in the output of the job. For example, the present invention finds application where the input to a job contains blank pages, or separator pages containing, for example, a logo, wherein the blank or logo bearing pages are not desired in the output of the job.

2. Description of Related Art

When handling and processing paper documents, such as, for example, reports and memos in an office environment, it is often too time consuming to concern oneself with paper conservation. For example, sometimes documents contain blank pages. For instance, a first portion of a document is printed from a file containing an extra form feed command and the pages are quickly gathered from an output tray of a printer and collated with a second portion of the document. The collated document is then copied many times. Each copy including the blank page. Alternatively, blank pages are intentionally inserted in a document as a means to separate sections of the document. Subsequent copies or faxings of the document do not require the separator pages. Nevertheless the separator pages are inadvertently duplicated. When copying or faxing a document that contains a blank page, the cost of copying or faxing the blank page may be inconsequential when compared to the time that would have to be spent searching for and removing the blank page from a set of pages being faxed or copied. Additionally, such search and remove operations, in a rushed and crowded office environment, are preformed at the risk of dropping and damaging and/or un-collating the document. Therefore, people involved in paper document reproduction often opt for the faster and safer practice of copying and faxing complete packets of papers, whether or not the packets include wasteful blank pages. Nevertheless, the practice is wasteful in many ways, including material, time, energy, and equipment wear. While the waste maybe minimal in any one instance, the aggregate waste, across time, and around the world, is significant.

Readily available printing systems, such as, for example, facsimile machines, personal computers, printers, copiers, and more sophisticated document processors, do not provide any assistance in eliminating this waste. As the impact our activities have on our environment becomes more apparent, there is a desire to minimizing that impact, if not where ever possible, at least where ever practical.

Therefore, it is desirable to provide, in a printing system, an inexpensive, fast, and automatic method for finding blank and undesired images or pages in an input document and excluding the undesired elements from a document output.

BRIEF SUMMARY OF THE INVENTION

To those ends, a method operative to automatically exclude a wasteful or unwanted portion of a job from an output stream of a printing system has been developed. The method comprises the steps of describing characteristics of the unwanted portion of the job, and searching within input image data for portions of the job that have the described characteristics.

If a portion of the job that appears to be wasteful or unwanted is located, the portion is removed automatically. Alternatively, an operator may intervene to prevent the removal.

An exemplary embodiment is a method operative to automatically exclude a blank page in an input stream of a printing system job from an output stream of the printing system job. The method comprises the steps of detecting data representative of a blank page in the input stream, and deleting the data representative of the blank page from the input stream, thereby excluding the blank page from the output stream.

A printing system operative to automatically remove unwanted portions of input image data comprises a pattern detector and a portion deleter. The pattern detector is operative to receive a description of an unwanted portion of the input image data, search for a portion of the input image data that corresponds to the description of the unwanted portion, and, if the search is successful, relate information about a found portion. The portion deleter is operative to receive information from the pattern detector, regarding a location of the found portion of the input image data, and remove the found portion of the input image data, to generate output image data.

One advantage of the present invention resides in the environmentally friendly ability to automatically prevent the duplication of unwanted portions of a printing system job, such as, for example, blank pages or separator pages.

Another advantage of the present invention is found in reduced printing system consumables costs.

Yet another advantage of the present invention is a reduction in printing system wear.

Another advantage of the present invention stems from a reduction in reproduction time. Time not spent reproducing or transmitting unwanted portions of a printing system job, results in a cost savings.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 1:
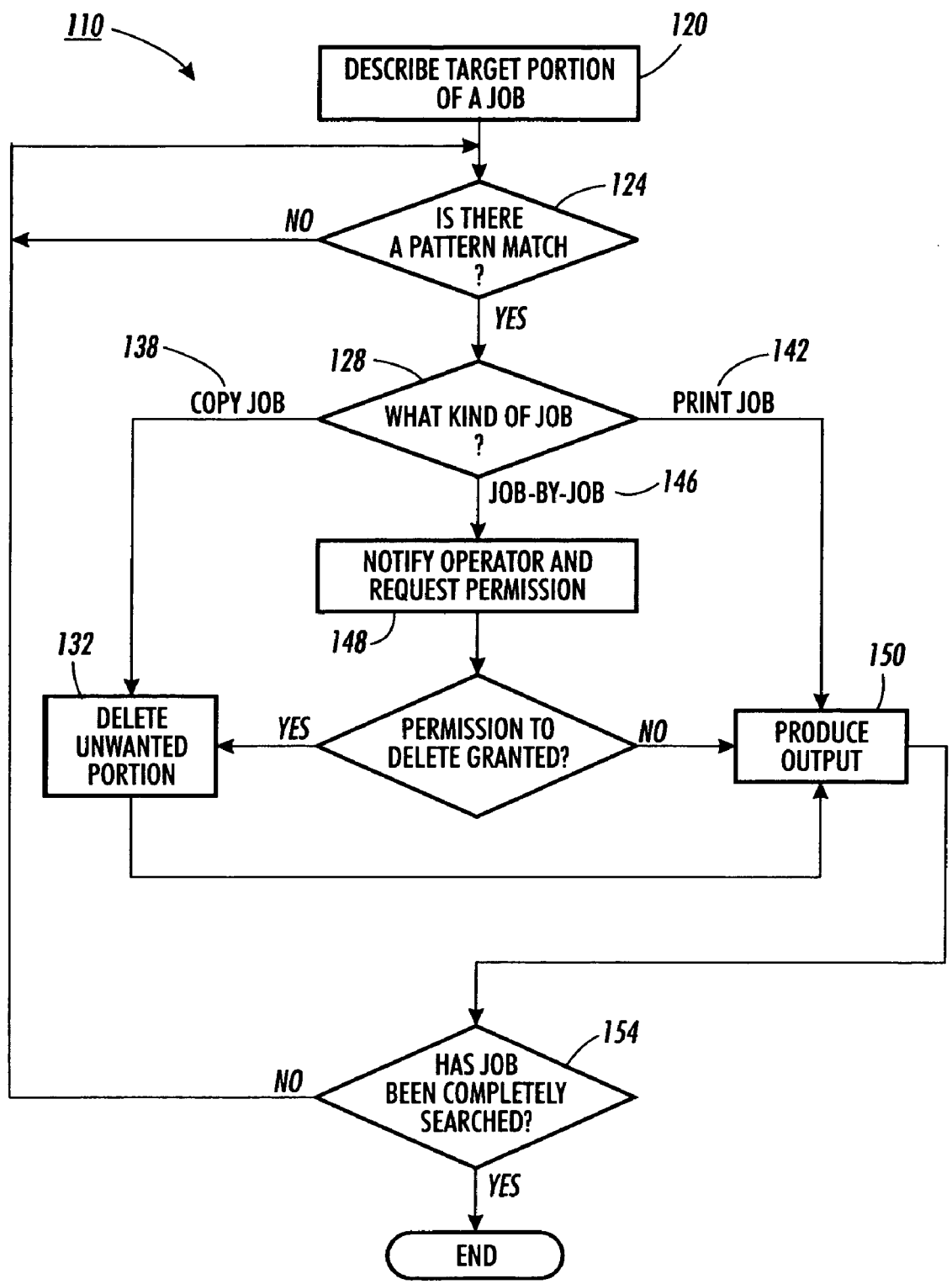
FIG. 1 is a flow diagram outlining steps in a method that is operative to exclude unwanted or wasteful portions of a printing system job.

Referring to FIG. 1, a method 110 operative to exclude unwanted or wasteful pages of a printing system job includes a target description step 120. Of course, the method 110 is also useful for removing unwanted portions of a page. In the target description step, a printing system, such as, for example, a personal computer, fax machine, document copier, or electronic publishing system, is given a description of an unwanted page. The description is for example, made a default or selected description. For example, the printing system is given a default description of a blank sheet or page. For example, a blank sheet or page is defined as any sheet having no marks or any sheet having less than a threshold amount of marking. For instance, any sheet or page that is described by input data to include marks on less that 0.5% of the area of the page is classified a blank page. Alternatively, an unwanted sheet or page is described by some other means. For example, a sample unwanted page, sheet or portion, is scanned into the printing system or delivered from a mass storage device or computer network. For example, a non-blank separator page is scanned into the printing system. For instance, a separator page may include a company logo, or an informational phrase such as "INTENTIONALLY LEFT BLANK" or "SECRET". Alternatively, separator page text is entered through a keyboard or electronic file. For example, an unwanted separator page is described by typing the phrase "INTENTIONALLY LEFT BLANK" on an operator interface, such as, for example, a keyboard.

Once the printing system has been initialized with an unwanted page or portion description, the job is entered into the system. For example, an electronic file or data stream is input into the printing system. Alternatively, a stack of document papers is loaded into an input tray of a scanner associated with the printing system. For example, papers are loaded into the input tray of a scanner of a fax machine or copier and scanning is initiated.

Once input scanning or file reading begins, an input imaged data stream is available to the printing system and image data can be tested in an input image data-testing step 124. Any appropriate image-testing scheme may be employed. For example, cross correlation techniques are employed to find input image data corresponding to scanned separator pages. Alternatively, optical character recognition techniques are used to find pages containing specified phrases. Preferably, the search technique is fast. For example, a statistical sampling is taken across an area of the described page. The sample is compared to a threshold value. For example, a sampled marked pixel percentage is compared to a threshold percentage of, for example, 0.5%. If the sampled marked pixel percentage of a page description is below the threshold, then the page description is classified a blank page. Alternatively, a total number of marked pixels called for in a page description are counted. The total is compared to a threshold value. If the total number of marked pixels in a page description is below the threshold, the page is classified as a blank page. Of course, unmarked pixels can be counted instead of marked pixels. In that case a total above a threshold would indicate a blank page.

Optionally, if a portion of the job is located that matches the description of the unwanted page, processing proceeds according to a job type classification. The job classification is determined in a job type determination step 128. Typically, job classification information is entered before a job is scanned and the information is read from a system memory. However, the printing system may query a system user for classification information at any appropriate time. Default processing procedures are followed based on the job type classification. For example, unwanted pages are automatically removed in an unwanted portion removal step 132 in copy/fax type jobs 138. In print type jobs 142, it is assumed that separator or blank pages are included in the input on purpose, therefore a default procedure for print type jobs 142 is to produce separator and blank pages. Of course, the job type determination step may be performed earlier, and where appropriate, the entire method 110 may be by passed if the job type does not warrant the use of the method 110. Alternatively, a job type classification is used to instruct a printing system to ask an operator for instructions on a job-by-job basis 146. In that case, when a portion of a job matches the description of an unwanted portion, the operator is notified in an operator notification step 148. Additionally, a request is made of the operator for permission or authorization to delete the located portion. If authority is granted the unwanted portion removal step 132 is performed. If portion removal is prohibited, then the portion is produced in an output production step 150. Of course, all portions of the job that do not correspond to the description of an unwanted portion are also produced in the output production step 150.

In an end of job testing step 154 a determination is made regarding whether or not the entire input stream has been searched. For example, if an end of file marker has not been reached, searching (step 124) resumes in unexamined portions of the input data. Eventually all wanted portions of the input data (including wanted portions that match the description of unwanted portions) are produced in the output production step 150. For example, all wanted portions of the job are faxed, copied, or electronically printed. Where appropriate, the unwanted portion removal step 132 not only deletes the unwanted portions from the printing system input stream, but also deletes the unwanted portions from an original input file. For example, a network file or file on a disk drive is updated with the unwanted portions of the file removed or deleted.

Figure 2:
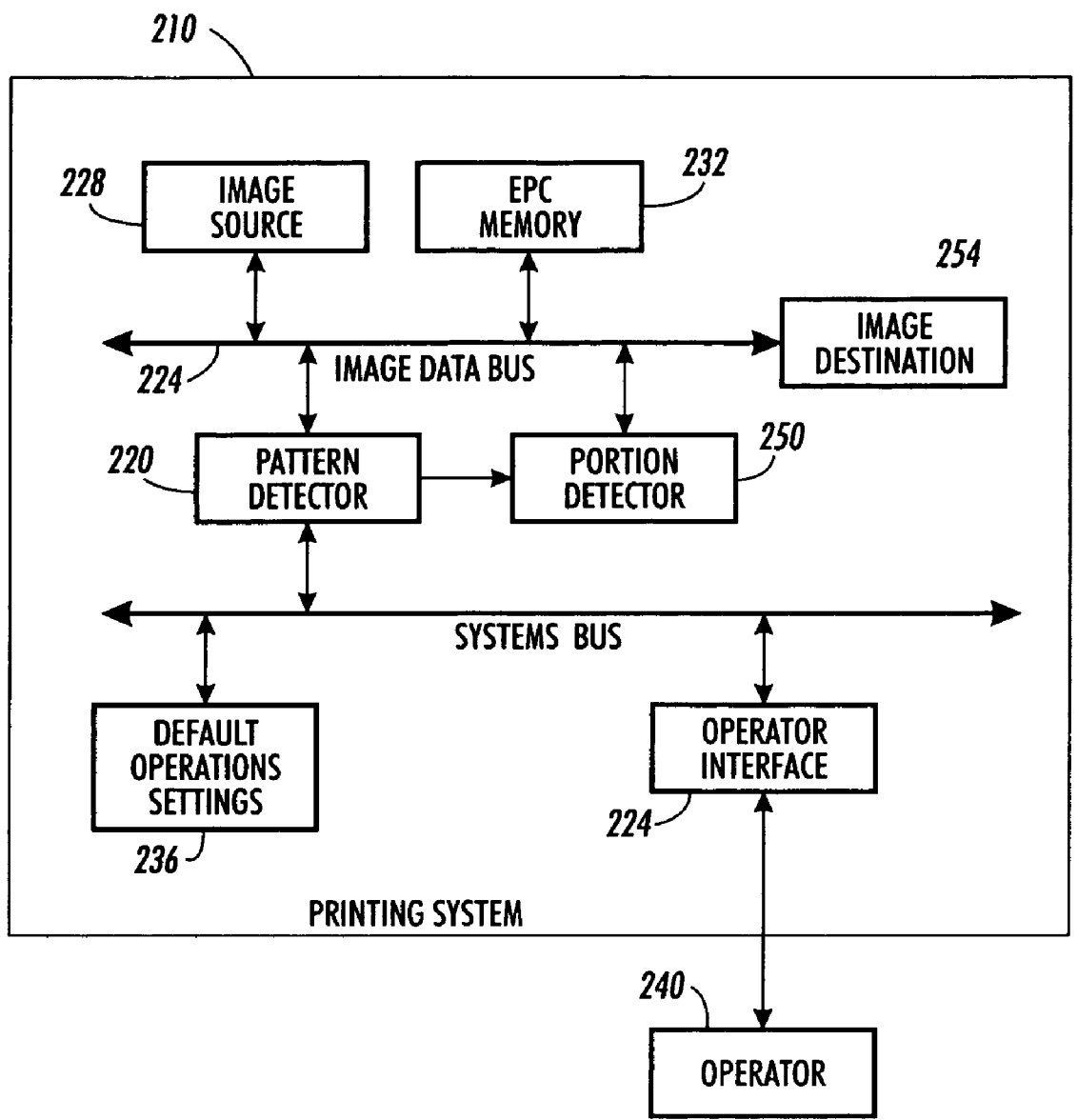
FIG. 2 is a block diagram of a printing system operative to perform the method of FIG. 1.

Referring to FIG. 2, a printing system 210 operative to perform the method 110 for excluding unwanted or wasteful pages of a printing system job includes a pattern detector 220. The pattern detector 220 has access to input image data. For example, the pattern detector 220 is in communication with an image data bus 224. The pattern detector 220 examines input data, for example, as the input data is delivered from an image source 228. The image source 228 is for example a document scanner, or an electronic file delivered from, for example, a computer network or mass storage device, such as, a disk drive. Alternatively, the pattern detector 220 examines image data that is in storage. For example, the pattern detector examines image data stored on a disk drive or in an electronic memory, such as for example an electronic pre-collation (EPC) memory 232.

The pattern detector 220 accepts an unwanted page description from an unwanted page description source. For example, a default blank page description is received from a default settings repository 236. Alternatively, the pattern detector 220 accepts operator input 240 through an operator interface 244. For example, the pattern detector 220 accepts a separator page phrase from an operator through a keyboard (not shown) on the operator interface 244. Alternatively, the pattern detector 220 receives instructions to accept a separator page pattern from the image source 228. For example, the pattern detector receives an unwanted separator page description from a scanner or from an electronic file.

Once the pattern detector 220 has a target pattern description, the pattern detector 220 examines input data in search of the described pattern. If the pattern detector 220 finds a page of the input image data corresponding to the unwanted image description, the pattern detector 220 proceeds according to system design or configuration information. For example, the pattern detector 220 determines a type of job that is being processed. If the job is described as, for example, a copy job, the pattern detector 220 passes information representative of the location of the unwanted page to the portion deleter 250. The portion deleter 250 deletes the unwanted page. For example, the portion deleter deletes the unwanted page from the input data stream, or from a storage location, such as, for example, the electronic pre-collation memory 232. If the job is classified as, for example "job-by-job", the pattern detector 220 notifies an operator through the operator interface 244, that a page that may be unwanted has been located. Additionally, the pattern detector 220 requests permission to delete the located page. If permission is granted the pattern detector 220 passes identifying or locating information about the unwanted page to the portion deleter 250. The portion deleter 250 then proceeds as described above and deletes the unwanted page. However, if the job is not a copy job or a "job-by-job" type job, but is instead, for example, a print job, then the portion is not deleted. Indeed, if the job is a print job then, in some implementations, the entire method 110 is bypassed.

Of course, all undeleted page of the input image data (including pages of the input image data that do not match the unwanted page description, and pages of the input image date that do match the unwanted page description, but are not deleted due to operator input) are allowed to proceed, through normal printing system processes, to an image destination 254. For example, the image destination 254 is a print engine or marking platform. For example, the image destination is a xerographic printer, inkjet printer, thermal printer or other hard copy producing device. Alternatively, the image destination 254 is a modem such as, for example, a fax modem, for transmitting an output data stream over telephone lines or a network interface for transmitting information over a computer network. Of course, other image destinations are also contemplated. For example, the output data stream may be delivered to a mass storage device such as a disk drive.

Typically the pattern detector 220 and the portion deleter 250 are implemented as software modules run by a computational platform (not shown) such as a microprocessor or digital signal processor. For example, the pattern detector 220 and the portion deleter 250 are included in a xerographic environment. Of course, the functions of the modules 220, 250 may be combined an implemented in a larger module. Alternatively, the functions may be distributed over a number of smaller modules. The default settings repository 236 is preferably implemented in a non-volatile memory such as EEPROM or flash memory. The EPC memory 232 may be volatile or non-volatile. Preferably, the EPC memory 232 is implemented in DRAM. The operator interface can be any operator interface, including for example, any of; a keyboard, liquid crystal display, touch screen, mouse, roller ball, CRT, and microphone and speaker.

The invention has been described with reference to particular embodiments. Modifications and alterations will occur to others upon reading and understanding this specification. For example, the invention may be applied in other kinds of printing systems. Searching and filtering techniques other than those mentioned may be used to find the unwanted portions of a job. Where the invention has been described in reference to deleting entire pages, the inventions may instead be used to delete only portions of a page or more than a single page. For example, logos and letterhead images may be deleted. Optionally, remaining portions of the input data may be moved. For example, to better use the space that was occupied by the logo or letterhead portions of a document may be automatically brought in closer proximity. Furthermore, stroke type objects may be recognized (in the searching step 124) and removed from input data (in the deleting step 132), thereby generating clean versions of marked up images. It is intended that all such modifications and alterations are included insofar as they come within the scope of the appended claims or equivalents thereof.

What is claimed is:

1. A method operative to automatically exclude an unwanted page in an input stream of a printing system main print job from an output stream of the main print job, the method comprising the steps of:
   establishing a characteristic of a page indicative of an unwanted page, the established characteristic including a description or indication of one or more mark or image included on the unwanted page;
   monitoring the input stream to detect data representative of the characteristic;
   identifying one or more pages of the main print job that contain data representative of the characteristic; and
   removing the identified pages thereby excluding them from the main print job output stream.

2. The method of claim 1 further comprising:
   notifying an operator in response to detecting data representative of the characteristic.

3. The method of claim 1 further comprising:
   requesting permission from a user to remove the identified pages.

4. A method operative to semi-automatically exclude unwanted portions of a main job from a main job output stream of a printing system, the method comprising the steps of:
   describing characteristics of the unwanted portions of the job, the described characteristics including a description of a mark included in the unwanted portions of the job;
   searching within input image data for portions of the main job that have the described characteristics;
   locating a portion of the input image data that has the described characteristics, thereby locating a potentially unwanted portion;
   notifying an operator that the potentially unwanted portion has been located;
   accepting one of an authorization and a prohibition from the operator to remove the potentially unwanted portion;
   determining that the potentially unwanted portion is an unwanted portion if the authorization is accepted; and
   removing the unwanted portion from a main job input stream, thereby excluding the unwanted portion from the main job output stream.

5. A method operative to automatically exclude unwanted portions of a main job from a main job output stream of a printing system, the method comprising:
   describing characteristics of the main job, the described characteristics including a description of a mark included in the unwanted portions of the job;
   searching within input image data for portions of the main job that have the described characteristics;
   locating a portion of the main job input image data that has the described characteristics;
   deleting the located portion of the main job input data to generate main job output data; and
   delivering the main job output data to the output stream.

6. The method of claim 5 wherein the step of describing characteristics comprises describing a characteristic of a non-blank separator sheet.

7. The method of claim 5 wherein the step of searching within input image data comprises using pattern recognition techniques to search for matching characteristics.

8. A printing system operative to automatically remove unwanted portions of main print job input image data, the printing system comprising:
- a pattern detector operative to receive an arbitrary description of an unwanted portion of the main print job input image data including marking information associated with the unwanted portion, search for a portion of the main print job input image data that corresponds to the unwanted portion description, and relate information about a found portion that corresponds to the description; and
- a portion deleter operative to receive information from the pattern detector regarding a location of the at least one unwanted portion of the main print job input image data and to remove the at least one unwanted portion of the main print job input image data to generate main print job output image data.

9. The printing system of claim 8 further comprising an image destination operative to receive the main print job output image data and at least one of, transmit the main print job output image data to another device and generate hard copy corresponding to the main print job output image data.

10. The printing system of claim 8 further comprising a default settings repository operative to store and make available to the pattern detector at least one of, a default unwanted portion description and processing procedure information.

11. The printing system of claim 9 wherein the image destination comprises a xerographic printer.

12. The printing system of claim 9 wherein the image destination comprises a facsimile modem.

13. A printing system operative to automatically exclude unwanted non-blank pages of a job from a main job output stream, the system comprising:
- means for describing one or more characteristics of a non-blank page that is unwanted;
- means for searching within main job input image data for portions of the job that have the described characteristics;
- means for locating a page of the main job input image data that has the described characteristics;
- means for deleting the located page from the main job input data to generate main job output data; and
- means for delivering the output data to the output stream.

14. The printing system of claim 13 wherein the means for describing one or more characteristics of a non-blank page that is unwanted comprises:
- means for describing text included on the unwanted non-blank page.

* * * * *